United States Patent [19]

Webster et al.

[11] Patent Number: 4,744,842
[45] Date of Patent: May 17, 1988

[54] METHOD OF MAKING A COATED PIPELINE

[75] Inventors: George A. Webster, Aberdeen; Steven A. Burton, Montrose, both of Scotland

[73] Assignee: Webco Limited, Scotland

[21] Appl. No.: 70,646

[22] Filed: Jul. 6, 1987

Related U.S. Application Data

[63] Continuation of Ser. No. 819,912, Jan. 16, 1986, abandoned.

[30] Foreign Application Priority Data

Jan. 17, 1985 [GB] United Kingdom ................ 8501196

[51] Int. Cl.⁴ ............................................. B32B 31/24
[52] U.S. Cl. ..................................... 156/78; 138/144; 138/146; 138/DIG. 9; 156/153; 156/188; 156/191; 156/245; 428/36; 428/313.3; 428/313.5
[58] Field of Search ......... 138/144, 145, 146, DIG. 9; 156/78, 153, 187, 188, 191, 245; 428/313.3, 313.5, 313.9, 36

[56] References Cited

U.S. PATENT DOCUMENTS 3,045,709 7/1962 Rapp .................................... 138/145
3,046,172 7/1962 Reid ............................. 428/313.7 X
3,814,659 6/1964 Nadeau .............................. 428/215

Primary Examiner—Robert A. Dawson
Attorney, Agent, or Firm—Ratner & Prestia

[57] ABSTRACT

A method for producing pipeline having a thermally insulating coating in which a continuous matrix of water-impermeable material has dispersed throughout it hollow microspheres or cellular particles which improve on heat insulating properties of the basic matrix.

9 Claims, 1 Drawing Sheet

METHOD OF MAKING A COATED PIPELINE

This application is a continuation of application Ser. No. 819,912, filed 1/16/86, now abandoned.

This invention relates to pipelines.

BACKGROUND OF THE INVENTION

It has previously been proposed to provide a pipeline having a thermally-insulating coating by enclosing sections of foamed polyurethane within an enveloping matrix of abrasion-resistant and corrosion-resistant elastomer such as polychloroprene. This coating is very effective for use on subsea pipelines which are subject to very low temperatures and a corrosive environment. There is a need, however, for a thermally-insulating coating which meets a less rigorous specification and is less expensive and yet provides a greater degree of insulation than a continuous coating.

Such coatings of less rigorous specification are those in which one or more layers of continuous non-foamed plastics or rubber material are applied to the pipeline. This provides excellent protection for the pipeline against corrosion and mechanical damage, but the heat insulation properties of the non-foamed material are considerably inferior to those of a foamed coating. In very cold environments such as offshore in deep water good heat insulation is often essential.

SUMMARY OF THE INVENTION

According to the present invention there is provided a pipeline having a thermally-insulating coating comprising a continuous matrix of a water-impermeable material having dispersed therein a plurality of discrete units of which at least a portion is hollow, said units being thermally conductive to a lesser degree than said water-impermeable material.

Said units may be for example walled spheres containing a heat-insulating liquid, a gas or a vacuum. Gas-filled microspheres are especially suitable, and their walls may be for example of glass or plastics material such as polyvinylidene. An alternative form of a discrete unit is a cluster of cells, for example of foamed material such as polyurethane or polyvinyl chloride. Each unit can be manufactured by foaming the material in a mould, and this produces a discrete cluster of cells surrounded by a continuous skin of the material. A number of such units can then be mixed with the water-impermeable material so that they become dispersed therethrough.

The units may be introduced into the water-impermeable material while the latter is in liquid form, or they may be present in one or more components of a mix which reacts to form the water-impermeable material. Such a mix is used when the water-impermeable material is polyurethane, in which case the units may be dispersed in an isocyanate or polyol component.

The material forming the units may be the same as or different from the water-impermeable material, although generally it will be different.

The water-impermeable material is preferably a polymer which is resilient to allow flexing of the pipeline during laying. The material is preferably abrasion-resistant, and a suitable example is polyurethane.

A corrosion-resistant layer may be provided between the pipeline and the thermally-insulating coating. This layer is preferably continuous for maximum resistance to penetration and may be for example a rubber product such as polychloroprene. Thus, even if the outer thermally-insulating coating is damaged the pipeline is protected from corrosion.

Said discrete units may range in size from a few microns to 200 microns in the case of microspheres to a centimetre or more in the case of clusters of cells; the particular units selected will depend on the type and use of the pipeline.

Each unit preferably has its own water-impermeable peripheral wall around it.

The units may be included in the water-impermeable matrix in an amount selected to suit the required properties of the pipeline and preferably reduce the specific gravity of the thermally-insulating coating as compared to the water-impermeable material by up to 60%. For example when a polyurethane water-impermeable matrix is used having a specific gravity of 1.1 the units may be dispersed through it in sufficient amount to reduce the specific gravity of the heat-insulating coating to around 0.5 to 1.0.

The thickness of the thermally-insulating coating will be dictated by ambient conditions and the insulating requirements of the pipeline, but generally for subsea use a thickness of 0.6 to 10 cm is appropriate.

Embodiments of the present invention will now be described, by way of example, with reference to the accompanying drawings, in which:

BRIEF DESCRIPTION OF THE DRAWINGS

Referring to FIGS. 1 and 2 of the drawings a pipeline coating 1 includes a heat-insulating resilient layer 2 which is 7.5 cm thick in the form of a body of polyurethane providing a matrix which has dispersed throughout it a plurality of polyvinylidene-walled hollow microspheres 3 containing isobutene. The microspheres 3 range in size from 10 to 100 microns. The pipeline coating 1 surrounds a steel pipe 4 which is 22 cm in diameter and of 1.6 cm wall thickness provided with a continuous rubber corrosion inhibiting coating 5 of polychloroprene. The coating 5 is 6 mm thick.

Figure 1:
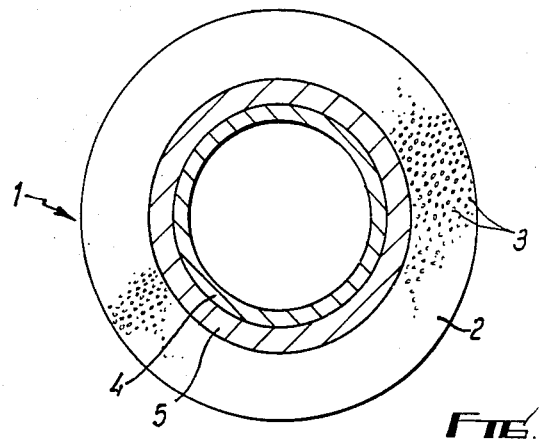
FIG. 1 is a sectional front view of a pipeline in accordance with the present invention.

The pipeline can have a length of 12,000 metres or more and can be of any external diameter, for example 15.25 cm, 20.3 cm or 35.5 cm. It extends from a wellhead (not shown) at which the oil temperature is about 48 degrees centigrade, and the oil flowing in the pipeline must be kept above 23 degrees centigrade to prevent waxing. The oil flow rate in the pipeline is from 6,000 BBPD in 15.25 cm and 20.3 cm diameter pipes to 30,000 BBPD in 35.5 cm pipes.

The polychloroprene of the coating 5 is sold under the Trade Mark LINECOTE by Webco Limited and is a flexible elastomer which is vulcanised and bonded to the pipeline, thus providing a tough coating which is highly chemical and temperature resistant and impervious to moisture and sea water. It is also resistant to abrasion and has high tear and tensile strength, is highly resistant to ozone attack and flex cracking and has lock temperature flexibility down to minus 30 degrees centigrade. It is resistant to oils, waxes and gases and most aliphatic hydrocarbons.

The polyurethane of the resilient layer 2 has a specific gravity of approximately 1.1, and the presence of the microspheres 3 reduces the specific gravity of the overall layer 2 to 0.7–0.8.

The large number of gas-filled microspheres 3 in the coating 1 gives the pipeline a good degree of thermal insulation and also provides a degree of abrasion resistance for the coating.

The walls of the microspheres 3 prevent water from penetrating through interconnecting bubbles in the coating, as can happen in the case of foamed polyurethane in which air bubbles rather than walled microspheres provide the insulation.

The pipeline of this embodiment can be manufactured as follows. The pipe 4 has its layer of polychloroprene 5 applied by first cleaning the pipe 4 by shotblasting to a minimum SA 2.5, applying a primer, spirally winding a strip of uncured polychloroprene onto the pipe 4, applying a spiral winding of nylon tape under tension on the polychloroprene to hold it firmly on the pipe, and then heating the pipe with its windings at 150° C. and 60 psi to vulcanise the polychloroprene. The nylon tape is then removed, leaving the cured polychloroprene which then forms a continuous layer 5 around the pipe 4.

The pipe 4 with its polychloroprene coating 5 is then placed in a mould, and a mixture of polyurethane having the polyvinylidene walled microspheres 3 evenly dispersed through it is injected into the mould around the coated pipe 4. The polyurethane is then allowed to cure, forming the resilient layer 2. The polyurethane monomers consist of isocyanate and polyol, and prior to their introduction into the mould they are maintained apart in separate holding tanks. In the present case the microspheres are all contained in the polyol, but may equally well be contained in the isocyanate or dispersed through each component prior to mixing.

The isocyanate and microsphere-containing polyol are fed separately to a mixing and dispensing machine in which they are intimately mixed and fed in continuous manner into the mould. The isocyanate and polyol react in the mould to form the polyurethane around the dispersed microspheres 3, providing a gel within seven minutes of mixing.

Figure 2:
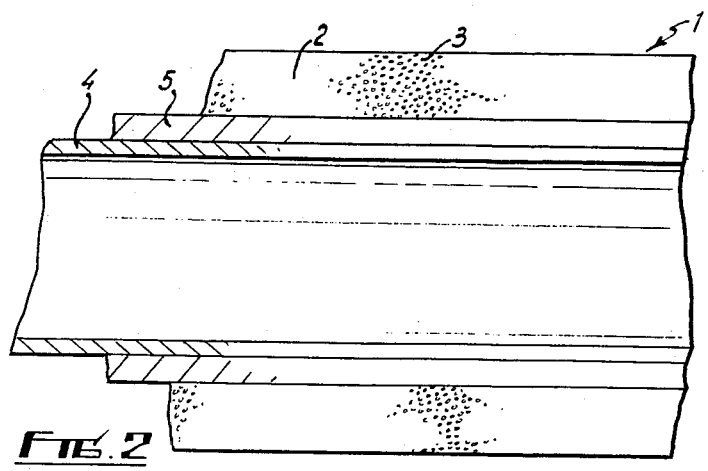
FIG. 2 is a part sectional side view of the pipeline of FIG. 1.
Figure 3:
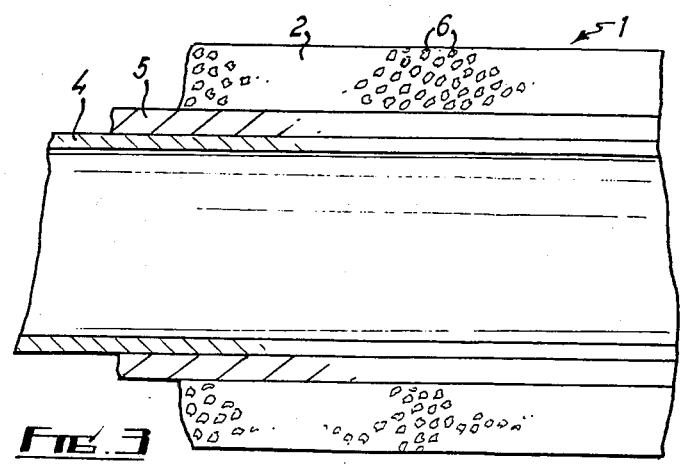
FIG. 3 is a part sectional side view of a pipeline of an alternative embodiment of the invention.

Referring now to FIG. 3 the arrangement shown is generally the same as that of FIGS. 1 and 2, with the sole exception that the microspheres 3 are replaced by discrete foam cluster units 6. These units are dispersed throughout the polyurethane matrix 2 in similar fashion to the microspheres, but are of considerably greater size, being up to 1.3 cm across. Each unit 6 consists of a section of foamed polyvinyl chloride having a number of gas-filled voids in it and having a continuous peripheral wall of polyvinyl chloride. The units 6 are formed in separate moulds and cured in the moulds before their introduction into one of the polyurethane monomers.

Modifications and improvements may be made without departing from the scope of the invention.

We claim:

1. A method for producing a conduit having a thermally insulating, resilient, water impermeable coating comprising the steps of:
   providing a mould around a conduit;
   supplying to said mould a mixture of chemicals which are capable of reacting chemically together to form a thermally insulating, resilient, water impermeable material, said mixture having dispersed therein a plurality of discrete units of which at least a portion is hollow;
   providing conditions in said mould to cause chemical reaction between said chemicals throughout said mould thereby to form said thermally insulating, resilient, water impermeable material containing said discrete units dispersed therein;
   removing said thermally insulating, resilient, water impermeable covered conduit from said mould.

2. The method as set forth in claim 1 wherein said chemicals adapted to react together to form said thermally insulating, resilient, water impermeable material are polyurethane monomers.

3. The method as set forth in claim 2 wherein said polyurethane monomers are isocyanate and polyol.

4. The method as set forth in claim 1 wherein said discrete hollow units are microspheres approximately 10 to 100 microns in size.

5. The method as set forth in claim 4 wherein said microsphere walls are polyvinylidiene.

6. The method as set forth in claim 1 further including the step of thermosetting said thermally insulating, resilient, water impermeable material.

7. The method as set forth in claim 1 wherein said conduit is provided with a corrosion resistant coating prior to providing said mould around said conduit.

8. The method as set forth in claim 7 wherein said corrosion resistant coating is thermoset neoprene.

9. A method for producing a conduit having a thermally insulating, resilient, water impermeable coating comprising the steps of:
   preparing the surface of said conduit comprising the steps of cleaning the surface of said conduit by shotblasting and applying a coat of primer to said surface;
   applying to said prepared conduit surface a continuous layer of polychloroprene spirally wrapped around the surface of said conduit and securing said material firmly in place about said conduit surface by tightly winding nylon tape over said material;
   heating said conduit and its wrappings at 150° C. and 60 psi sufficient to vulcanize said polychloroprene onto said conduit surface;
   removing said nylon tape;
   placing said cured polychloroprene conduit into an injection mould;
   injecting a mixture of polyol and isocyanate monomers into said mould, wherein at least one of said monomers contains dispersed therein a plurality of hollow, gas filled microspheres and wherein said monomers are adapted to react together to form a thermally insulating, resilient polyurethane coating on the surface of said cured polychloroprene covered conduit;
   allowing said chemicals to react in said injection mould and to form said thermally insulating, resilient coating;
   allowing said thermally insulating, resilient coating to cure for a predetermined period of time;
   removing said resilient, water impermeable covered conduit from said mould.

* * * * *